United States Patent
Yang et al.

(10) Patent No.: US 8,745,621 B2
(45) Date of Patent: Jun. 3, 2014

(54) METHOD FOR MANAGING GREEN POWER OF A VIRTUAL MACHINE CLUSTER

(75) Inventors: Chao-Tung Yang, Taichung (TW);
Hsiang-Yao Cheng, New Taipei (TW);
Kuan-Chieh Wang, Taichung (TW)

(73) Assignee: Tunghai University, Taichung (TW)

( * ) Notice: Subject to any disclaimer, the term of this patent is extended or adjusted under 35 U.S.C. 154(b) by 234 days.

(21) Appl. No.: 13/495,934

(22) Filed: Jun. 13, 2012

(65) Prior Publication Data

US 2013/0145365 A1    Jun. 6, 2013

(30) Foreign Application Priority Data

Dec. 1, 2011    (TW) .............................. 100144245 A

(51) Int. Cl.
*G06F 9/455*    (2006.01)

(52) U.S. Cl.
USPC ............................................................ 718/1

(58) Field of Classification Search
USPC ............................................................ 718/1
See application file for complete search history.

(56) References Cited

U.S. PATENT DOCUMENTS

| | | | |
|---|---|---|---|
| 2011/0072138 A1* | 3/2011 | Canturk et al. | 709/226 |
| 2012/0204176 A1* | 8/2012 | Tian et al. | 718/1 |
| 2013/0055260 A1* | 2/2013 | Zlotkin | 718/1 |
| 2013/0339956 A1* | 12/2013 | Murase et al. | 718/1 |

OTHER PUBLICATIONS

Chao-Tung Yang, Kuan-Chieh Wang, Hsiang-Yao Cheng, & Cheng-Ta Kuo, ". . . Green Management Algorithm for . . . Cloud Computing", CTHPC 2011, Jun. 2-3, 2011.
Chao-Tung Yang, Wei-Li Chou, Hsing-Yao Cheng & Cheng-Ta Kuo, ". . .Virtual Machines Reliability with . . . Fault Tolerance on Cloud", CTHPC 2011, Jun. 2-3, 2011.

* cited by examiner

*Primary Examiner* — Emerson Puente
*Assistant Examiner* — Steven Do

(57) ABSTRACT

A method for managing green power determines if how many physical machines should run or be shut off with the gross occupied resource weight ratio of the virtual machine cluster. The standby physical machine in the non-running physical machines is elected and woke up to join as one of the running physical machines; one of the running physical machines is elected as a migration physical machine with the virtual machines therein being moved to other running physical machines, and then shut off. The resource allocation process is conducted to distribute loads of the running physical machines such that the total numbers of the running physical machines are capable of being dispatched flexibly to achieve the object of green power management.

9 Claims, 3 Drawing Sheets

METHOD FOR MANAGING GREEN POWER OF A VIRTUAL MACHINE CLUSTER

CROSS-REFERENCE

A technical literature published by the inventors in the 13$^{th}$ IEEE International Workshop on Future Trends of Distributed Computing System (FTDCS 2011) held in Banff, Alberta. Canada during Sep. 2-4, 2011 entitled "Green Power Management with Dynamic Resource Allocation for Cloud Virtual Machines". Said literature is incorporated herein by reference.

BACKGROUND OF THE INVENTION

1. Field of the Invention

The present invention is related to a virtual machine cluster, and, more particularly, to a method for managing green power of a virtual machine cluster.

2. Brief Description of the Related Art

Since the computer was available in the market, the human life has rapidly become more and more reliant on the computer, and application of the computer has been more popular in various living places such as families, offices, entertainments, markets, restaurants, transportation tools, and schools. Currently, the computer is one of necessities in our daily lives, and its importance is invaluable.

The software and hardware for the computer are developed ineffably along with unceasing progress of the digital technology. In the early times, the computer with single core processor, which was independently used everywhere, could provide services satisfying needs of most users. However, in order to meet more complicated works and service speeds which are expected by the users, on the one hand, the application network has been developed to connect multiple computers for the computers being capable of sharing the services and works so as to achieve the effect of service widely and speedily, and, on the other hand, the computer with multi-core processors has been developed as a servo host to enhance the effect of service.

Recently, due to development of cloud technology, a network service system with gathering multiple servo hosts becomes a basic system framework of the cloud service; wherein, it is naturally needed that a single servo host executes more different incompatible application programs to avoid the servo host in a state of low usage rate. Under the circumstances, the virtual machine simulation software running on each of physical machines such as servo hosts is applied to logically divide the servo host into multiple virtual machines to achieve a purpose of sharing resources commonly, and it becomes the best cloud service system framework which not only offers more executable application programs to share the resources but also promotes the reliability of service of the servo host.

In a cloud service system framework of a virtual machine cluster consisting of multiple physical machines such as servo hosts, it is not easy to control load changes of the physical machines accurately; as a result, when the system is operated with excessively high or low loads, consumption of the power thereof is wasted unintentionally such that it is incapable of meeting requirements of the contemporary environmental protection for the green power, and it is necessary and worth to improve the deficiency.

SUMMARY OF THE INVENTION

Accordingly, an object of the present invention is to provide a method for managing green power of a virtual machine cluster to control the load rate of the virtual machine cluster.

In order to achieve the preceding object, the method for managing green power according to the present invention is suitable for green power management of the virtual machine cluster, wherein the virtual machine cluster consists of a plurality of physical machines such as servo hosts and the total numbers of the physical machines are represented by P in which there are a plurality of running physical machines and the total numbers of the running physical machines are represented by p with at least a virtual machine, and the remainder physical machines represented by P-p are off and in a state of standby.

The method for managing green power comprises following steps: calculating the gross occupied resource weight ratio of the virtual machine cluster which is a ratio of the sum of resource weights of all virtual machines proportional to the sum of available resource weights of the p running physical machines; when the gross occupied resource weight ratio being greater than a maximum tolerant occupied resource weight ratio λ set by the user, and p<P, electing and waking up a standby physical machine in non-running physical machines to join as one of the running physical machines, i.e., p=p+1; when the gross occupied resource weight ratio being less than a minimum critical occupied resource weight ratio β, and p>1, electing one of the running physical machines as a migration physical machine, moving the virtual machine of the migration physical machine to other running physical machines, and shutting off the migration physical machine; executing a resource allocation process to distribute loads of the running physical machines.

Wherein, the gross occupied resource weight ratio $\theta_{LOAD}$ is calculated with following equation:

$$\theta_{Load} = \sum_{i=1}^{n}(VM_{jiCPUuse} * VM_{jiRAMallocate}) \bigg/ \sum_{j=1}^{P}(PM_{jCPU} * PM_{jRAM})$$

In the preceding equation, j is a serial number of the respective physical machine, i is a serial number of the respective virtual machine, p represents the total numbers of the running physical machines of the virtual machine cluster, n represents the total number of the virtual machines, $VM_{jiCPUuse}$ is a processor load rate of i virtual machine in j physical machine, $VM_{jiRAMallocate}$ is a memory allocation of i virtual machine in j physical machine, $PM_{jCPU}$ is a processor resource in j physical machine, and $PM_{jRAM}$ is a memory resource in j physical machine.

Wherein, the elected standby physical machine is a non-running physical machine capable of allowing the value of the gross occupied resource weight ratio calculated again closest to $(\lambda+\beta)/2$ after running.

Wherein, one of the running physical machines with the least load or the least virtual machines is elected as the migration physical machine.

Wherein, the resource allocation process, which is a dynamic resource allocation process for distributing loads of the running physical machines evenly, further comprises following steps: calculating a virtual machine occupying resource weight of the respective virtual machine, a physical machine occupying resource weight of the respective physical machine and an average physical machine occupying resource weight of all the physical machines; executing following steps when a difference between the physical machine occupying resource weight and the average physical machine occupying resource weight being greater than a migration default value:

electing a physical machine with a maximum physical machine occupying resource weight as the migration source machine;

electing a physical machine with a minimum physical machine occupying resource weight as a migration target machine;

calculating a migration difference between the physical machine occupying resource weight of the migration source machine and the average physical machine occupying resource weight;

electing a virtual machine in the migration source machine with the virtual machine occupying resource weight thereof closest to the migration difference as a migration virtual machine;

moving the migration virtual machine to the migration target machine.

Wherein, the virtual machine occupying resource weight, the physical machine occupying resource weight, and the average physical machine occupying resource weight are calculated based on the resources of the processors and the memories in the physical machine.

Wherein, the virtual machine occupying resource weight, the physical machine occupying resource weight, and the average physical machine occupying resource weight are calculated with following equations:

$$VM_{jiRate} = (VM_{jiCPUuse} * VM_{jiRAMallocate}) \bigg/ \sum_{i=1}^{n} (VM_{jiCPUuse} * VM_{jiRAMallocate})$$

$$HOST_{jRate} = \sum_{i=1}^{v} VM_{jiRate}$$

$$\alpha = 1/p$$

In the preceding equations, j is a serial number of the respective physical machine, i is a serial number of the respective virtual machine; p represents the total numbers of the running physical machines; n represents the total numbers of the virtual machines; v represents the total numbers of the virtual machines in the respective physical machine; $VM_{jiRate}$ is a virtual machine occupying resource rate of i virtual machine in j physical machine to act as aforementioned virtual machine occupying resource weight, i.e., the rate of the occupying resource in i virtual machine of j physical machine proportional to the occupying resource in the virtual machine cluster; $VM_{jiCPUuse}$ is a processor load rate of i virtual machine in j physical machine; $VM_{jiRAMallocate}$ is a memory allocation of i virtual machine in j physical machine; $HOST_{jRate}$ is a physical machine occupying resource rate of j physical machine to act as aforementioned physical machine occupying resource weight, i.e., the sum of the virtual machine occupying resource rates in the j physical machine; $\alpha$ is an average physical machine occupying resource rate of the physical machines to act as aforementioned average physical machine occupying resource weight.

As the forgoing, the method for managing green power according to the present invention is capable of controlling the load rate of the virtual machine cluster in a range set by the user such that the load being too high or too low will not happen. In addition, the virtual machines in the physical machine with high load rate can be migrated to the physical machine with low load rate to achieve the effect of energy conservation.

BRIEF DESCRIPTION OF THE DRAWINGS

The detail structure, the applied principle, the function and the effectiveness of the present invention can be more fully understood with reference to the following description and accompanying drawings in which.

DETAILED DESCRIPTION OF THE INVENTION

Figure 1:
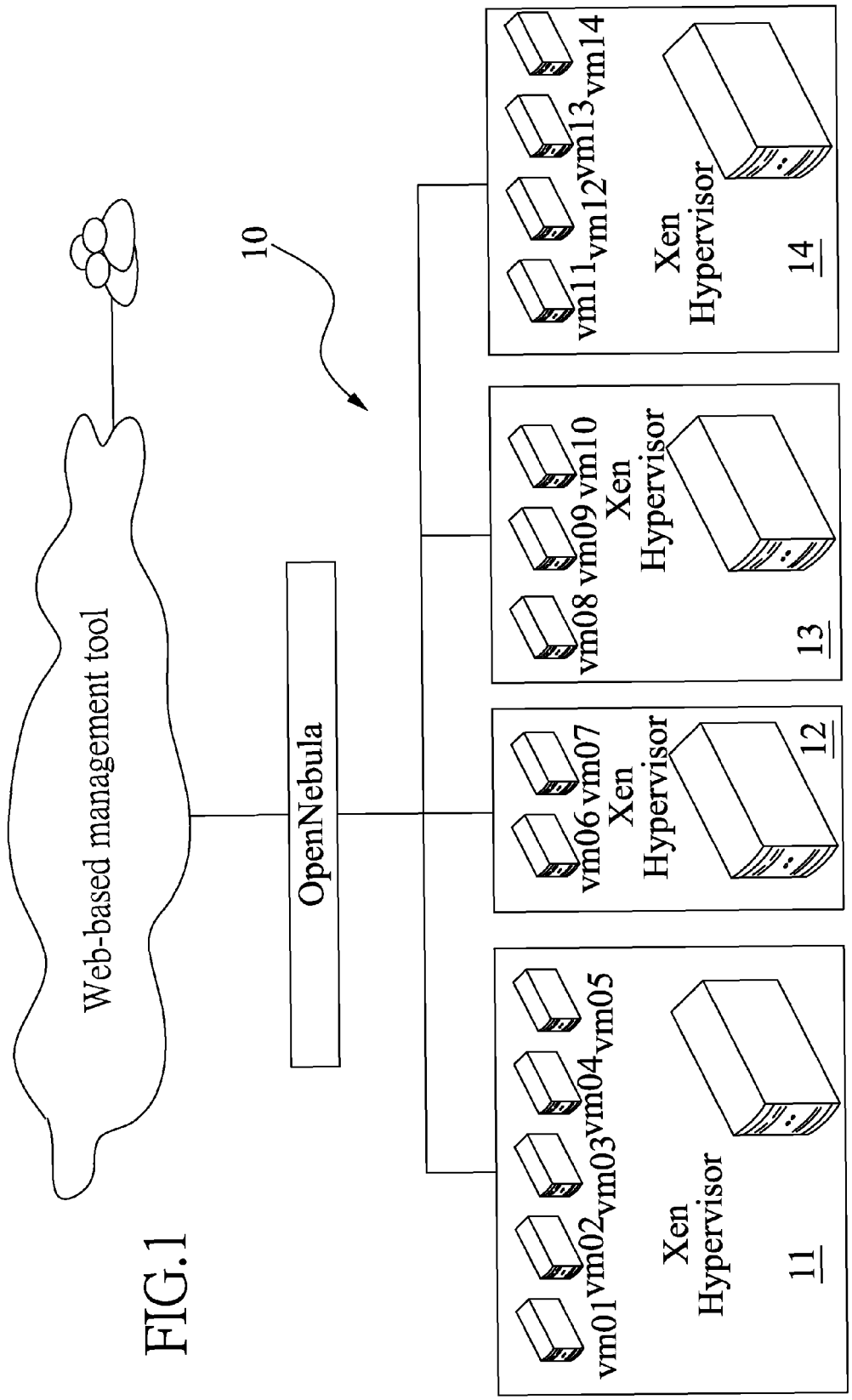
FIG. 1 is a block diagram illustrating the system framework of a method for managing green power of a virtual machine cluster according to the preferred embodiment of the present invention.

Referring to FIG. 1, the system framework of a method for managing green power according to the preferred embodiment of the present invention is illustrated. The method for managing green power illustrated in the preferred embodiment of the present invention is a web-based management tool to conduct the green power management of a virtual machine cluster 10.

Wherein, the virtual machine cluster 10 consists of P physical machines such as servo hosts in which there are p physical machines 11, 12, 13, 14, . . . , p are in a state of running respectively (only four running physical machines 11, 12, 13, 14 are shown to represent the p running physical machines), and P-p physical machines are in a state of being off and standby respectively (not shown); the running physical machines 11, 12, 13, 14 each execute Xen Hypervisor software to simulate one or more virtual machines vmxx; life migrations of the virtual machines vmxx are operated and managed by the OpenNebula software.

Figure 2:
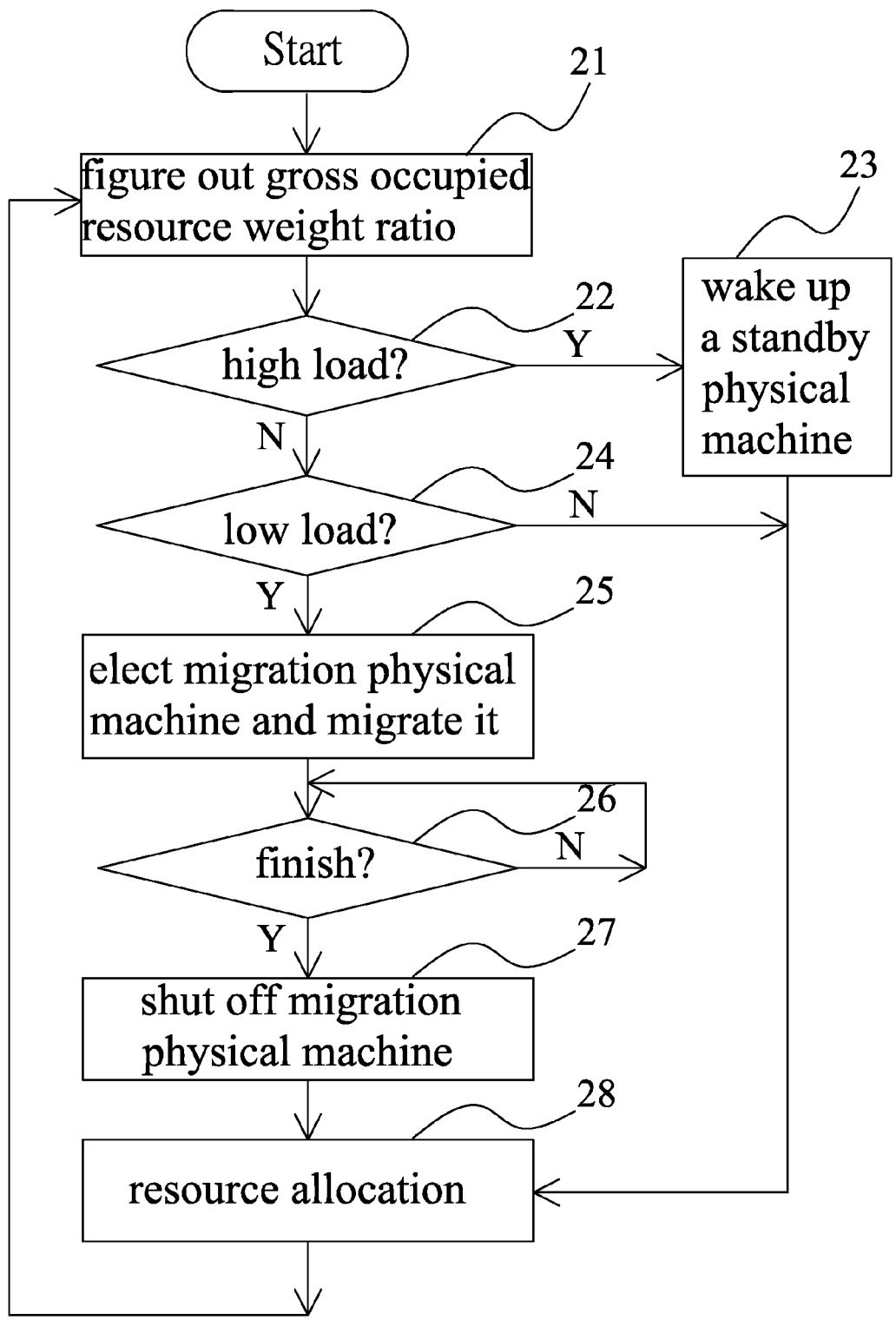
FIG. 2 is a flow chart illustrating steps of the method for managing green power of a virtual machine cluster according to the preferred embodiment of the present invention.

Referring to FIG. 2 in company with FIG. 1, the flow chart shown in FIG. 2 illustrates steps of the method for managing green power disclosed in the preferred embodiment of invention. Step 21 shown in FIG. 2 is to figure out gross occupied resource weight ratio of the virtual machine cluster; the gross occupied resource weight ratio is referred to a rate of sum of occupied resource weights of all the virtual machines vmxx proportional to the sum of resource weights of all the running physical machines 11, 12, 13, 14 shown in FIG. 2.

Next, determine if loads of all the running physical machines 11, 12, 13, 14 are excessively high in Step 22, and when the gross occupied resource weight ratio of the running physical machines 11, 12, 13, 14 is greater than a maximum tolerant occupied resource weight ratio λ set by the user, it means the loads are excessively high; at the moment, if there are physical machines still not running, that is, a condition p<P is true, one of the standby physical machines is elected to join as one of the running physical machines in Step 23. In other words, the numbers of the running physical machines are increased to p+1 from p, and then enter step 28 to move part of the virtual machines vmxx corresponding to the running physical machines 11, 12, 13, 14 into the newly added physical machine to allocate the loads of physical machines again.

In step 22, if it is determined that the loads of the physical machines 11, 12, 13, 14 are not excessively high, step 24 is processed to determine if the loads are excessively low, and when the gross occupied resource weight ratio corresponding to the running physical machines 11, 12, 13, 14 is lower than a minimum critical occupied resource weight ratio β set by the user, it means the loads are excessively low; at the moment, if there are two or more running physical machines, that is, a condition p>1 is true, one of the running physical machines 11, 12, 13, 14 is elected as a migration physical machine in step 25, and the virtual machines vmxx in the elected migration physical machine are moved to other running physical machines; then step 26 is executed to check if the migration is finished, and step 27 is processed to shut off the elected migration physical machine as a standby physical machine when it is determined that the migration is done; in other words, the numbers of the running physical machines are decreased to p−1 from p; further, step 28 is processed to conduct a procedure of resource allocation electively for the loads of the running physical machines.

In step 21, the gross occupied resource weight ratio $\theta_{LOAD}$ is calculated with occupied resource amounts of processors and memories of the physical machines 11, 12, 13, 14, and, for instance, it can be figured out with following equation (1):

$$\theta_{Load} = \sum_{i=1}^{n}(VM_{jiCPUuse} * VM_{jiRAMallocate}) \Big/ \sum_{j=1}^{p}(PM_{jCPU} * PM_{jRAM}) \quad (1)$$

wherein j is a serial number of the respective physical machine, i is a serial number of the respective virtual machine, p represents total numbers of the running physical machines of the virtual machine cluster, n represents total numbers of the virtual machines, $VM_{jiCPUuse}$ is processor load rate of i virtual machine in j physical machine, $VM_{jiRAMallocate}$ is memory allocation of i virtual machine in j physical machine, $PM_{jCPU}$ is processor resource in j physical machine, and $PM_{jRAM}$ is memory resource in j physical machine.

In step 23, when electing the standby physical machine, the elected standby physical machine is joined as one of the running physical machines and the gross occupied resource weight ratio is recalculated again; it is a principle that the recalculated gross occupied resource weight ratio will be closest to (λ+β)/2 for physical machines of the virtual machine cluster capable of running in a state of better load condition after the standby physical machine is joined as one of the running physical machines.

In step 25, when electing the migration physical machine, it is a principle that one of the running physical machines 11, 12, 13, 14 with the least load or virtual machines is elected to facilitate the process of migration.

Figure 3:
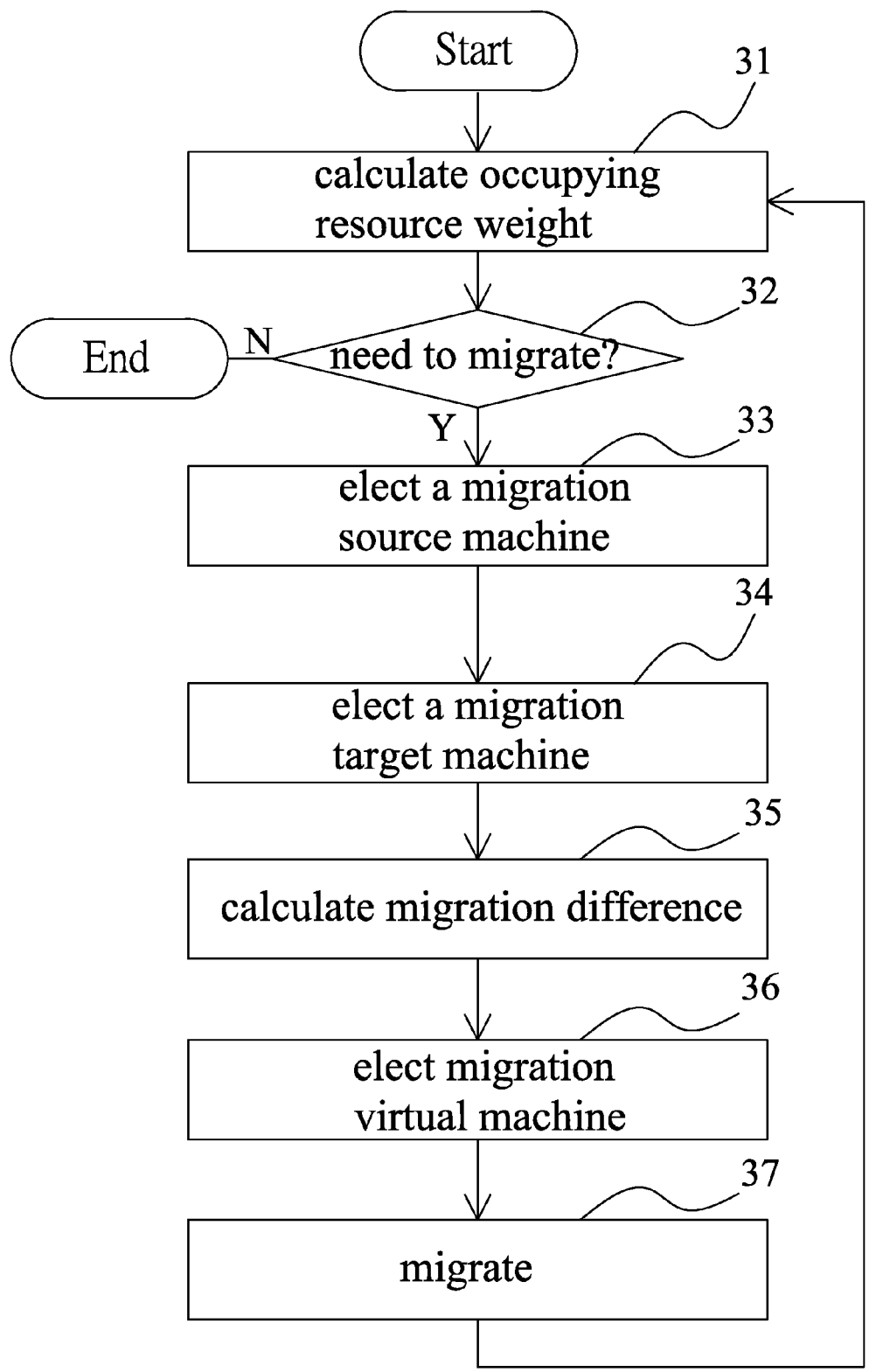
FIG. 3 is a flow chart illustrating a process for the resource allocation shown in FIG. 2.

Referring to FIG. 3, the resource allocation process in step 28 will be explained how to allocate the loads of the running physical machines 11, 12, 13, 14 again hereinafter with the flow chart shown in FIG. 3. In FIG. 3, the conducted resource allocation process is a dynamic resource allocation process capable of allocating the loads of the running physical machines 11, 12, 13, 14 evenly.

Step 31 in the flow chart of FIG. 3 is to calculate the virtual machine occupying resource weight of each of the virtual machines vmxx, the physical machine occupying resource weight of each of the physical machines and average physical machine occupying resource weight of all the physical machines.

Wherein, the virtual machine occupying resource weight of each of the virtual machines vmxx, the physical machine occupying resource weight of each of the physical machines and average physical machine occupying resource weight of all the physical machines are figured out with the virtual machines vmxx using resources of the processors and memories in the physical machines 11, 12, 13, 14 to obtain a virtual machine occupying resource rate representing the virtual machine occupying resource weight of the respective virtual machine vmxx, a physical machine occupying resource rate representing the physical machine occupying resource weight of the respective physical machine, and an average physical machine occupying resource rate representing the average physical machine occupying resource weight of all the physical machines. Following equations are applied to calculate the preceding rates:

$$VM_{jiRate} = \qquad (2)$$
$$(VM_{jiCPUuse} * VM_{jiRAMallocate}) \Big/ \sum_{i=1}^{n}(VM_{jiCPUuse} * VM_{jiRAMallocate})$$

$$HOST_{jRate} = \sum_{i=1}^{v} VM_{jiRate} \qquad (3)$$

$$\alpha = 1/p \qquad (4)$$

Wherein, j is a serial number of the respective physical machine 11, 12, 13, 14, i is a serial number of the respective virtual machine; p represents total numbers of the running physical machines 11, 12, 13, 14 of the virtual machine cluster 10, i.e., 4; n represents total numbers of the virtual machines vmxx in the virtual machine cluster 10, i.e., 14; v represents total numbers of the virtual machines of the respective physical machines 11, 12, 13, 14, i.e., 5, 2, 3, and 4 respectively; $VM_{jiRate}$ is virtual machine occupying resource rate of i virtual machine in j physical machine; $VM_{jiCPUuse}$ is processor load rate of i virtual machine in j physical machine; $VM_{jiRAMallocate}$ is memory allocation of i virtual machine in j physical machine; $HOST_{jRate}$ is physical machine occupying resource rate of j physical machine; a is an average physical machine occupying resource rate.

In the preceding equations (1), (2), (3), and (4), although the load rate $VM_{jiCPUuse}$ and the memory allocation $VM_{jiRAMallocate}$ of the respective virtual machine in each of the physical machines 11, 12, 13, 14 are calculated in percentage to obtain the gross occupied resource weight ratio $\theta_{LOAD}$ and the virtual machine occupying resource rate $VM_{jiRate}$, the physical machine occupying resource rate $HOST_{jRate}$, and the average physical machine occupying resource rate α to act as the virtual machine occupying resource weight, the physical machine occupying resource weight, and the average physical machine occupying resource weight respectively, a person skillful in the art should know that other resources in the physical machines 11, 12, 13, 14 such as storage devices can be taken into account, or the weight values can be calculated with other different equations.

After the virtual machine occupying resource weight of each of the virtual machines vmxx, the physical machine occupying resource weight of each of the physical machines 11, 12, 13, 14, and average physical machine occupying resource weight of all the physical machines 11, 12, 13, 14 having been figured out, it is determined in step 32 if the migration of virtual machine is processed, and when a difference between the physical machine occupying resource weight of any one of the physical machines 11, 12, 13, 14 and the average physical machine occupying resource weight is greater than, for instance, a migration default value σ set by the user, steps 33~37 are conducted to process the migration.

In step 33, a physical machine with the maximum physical machine occupying resource weight is elected as a migration source machine, then, in step 34, a physical machine with the minimum physical machine occupying resource weight is elected as a migration target machine, further, in step 35, a migration difference between the physical machine occupying resource weight of the migration source machine and the average physical machine occupying resource weight is calculated, further, in step 36, a virtual machine with the virtual machine occupying resource weight thereof closest to the migration difference is elected as a migration virtual machine, and, finally, in step 37, the migration virtual machine is moved to the migration target machine to complete a resource allocation cycle and enter another resource allocation cycle.

It is supposed that the physical machines 11, 12, 13, 14 in FIG. 1 each is a servo host with 8 processor cores and 8192 Kbytes memory such that the available processor load rate of each of the physical machines 11, 12, 13, 14 is 8*100=800. Besides, the processor load rate $VM_{jiCPUuse}$ and the memory allocation $VM_{jiRAMallocate}$ of the virtual machines vmxx in each of the physical machines 11, 12, 13, 14, and the values figured out with the preceding equations (2)(3) are shown in following table (The unit of the memory allocation $VM_{jiRAMallocate}$ is Kbytes):

| Physical Machine | Virtual Machine | $VM_{jiCPUuse}$ | $VM_{jiRAMallocate}$ | $VM_{jiRate}$ | $HOST_{jRate}$ |
|---|---|---|---|---|---|
| 11 | Vm01 | 95 | 512 | 0.08 | 0.45 |
|  | Vm02 | 100 | 1024 | 0.17 |  |
|  | Vm03 | 40 | 2048 | 0.14 |  |
|  | Vm04 | 10 | 512 | 0.01 |  |
|  | Vm05 | 30 | 1024 | 0.05 |  |
| 12 | Vm06 | 70 | 1024 | 0.12 | 0.17 |
|  | Vm07 | 60 | 512 | 0.05 |  |
| 13 | Vm08 | 10 | 1024 | 0.02 | 0.05 |
|  | Vm09 | 15 | 512 | 0.01 |  |
|  | Vm10 | 20 | 512 | 0.02 |  |
| 14 | Vm11 | 45 | 1024 | 0.08 | 0.33 |
|  | Vm12 | 60 | 512 | 0.05 |  |
|  | Vm13 | 30 | 512 | 0.03 |  |
|  | Vm14 | 100 | 1024 | 0.17 |  |

It is supposed that the migration default value σ=0.05, and it is calculated with equation (4) that the average physical machine occupying resource rate α=¼=0.25 such that a difference ($HOST_{jRate}$-α) for the respective physical machines is found 0.20, -0.08, -0.20, and 0.08, and there are some of the difference values greater than the migration default value σ; under the circumstance, the migration has to be processed, and the physical machine 11, which provides the greatest physical machine occupying resource ratio 0.45, can be used as the migration source machine, and the physical machine 13, which provides the least physical machine occupying resource ratio 0.05, can be used as the migration target machine. In addition, the virtual machine occupying resource ratio $VM_{jiRate}$ of the virtual machine vm02 is 0.17, and it is closest to the migration difference 0.20 of the physical machine 11 such that the virtual machine vm02, which is used as the migration virtual machine, is migrated to the physical machine 13. The results after migration is listed in a table presented hereinafter:

| Physical Machine | Virtual Machine | $VM_{jiCPUuse}$ | $VM_{jiRAMallocate}$ | $VM_{jiRate}$ | $HOST_{jRate}$ |
|---|---|---|---|---|---|
| 11 | Vm01 | 95 | 512 | 0.08 | 0.28 |
|  | Vm03 | 40 | 2048 | 0.14 |  |
|  | Vm04 | 10 | 512 | 0.01 |  |
|  | Vm05 | 30 | 1024 | 0.05 |  |
| 12 | Vm06 | 70 | 1024 | 0.12 | 0.17 |
|  | Vm07 | 60 | 512 | 0.05 |  |
| 13 | Vm02 | 100 | 1024 | 0.17 | 0.22 |
|  | Vm08 | 10 | 1024 | 0.02 |  |
|  | Vm09 | 15 | 512 | 0.01 |  |
|  | Vm10 | 20 | 512 | 0.02 |  |
| 14 | Vm11 | 45 | 1024 | 0.08 | 0.33 |
|  | Vm12 | 60 | 512 | 0.05 |  |
|  | Vm13 | 30 | 512 | 0.03 |  |
|  | Vm14 | 100 | 1024 | 0.17 |  |

After the migration being processed once, the difference ($HOST_{jRate}$-α) calculated again for the physical machines is 0.03, -0.08, -0.03, and 0.08, respectively, and there are still difference values greater than the migration default value σ; It is found that the physical machine 14, which has the greatest physical machine occupying resource ratio 0.33, can be used as the migration source machine, and the physical machine 12, which has the smallest physical machine occupying resource ratio 0.17, can be used as the migration target machine. In addition, the virtual machine occupying resource ratio $VM_{jiRate}$ of the virtual machine vm11 is 0.08, and it is closest to the migration difference 0.08 of the physical machine 14 such that the virtual machine vm11, which can be used as the migration virtual machine, is migrated to the physical machine 12. The difference ($HOST_{jRate}$-α) for the physical machines is 0.03, 0, -0.03, and 0, respectively, and the effect of load balance is achieved substantively.

While the invention has been described with referencing to the preferred embodiment thereof, it is to be understood that modifications or variations may be easily made without departing from the spirit of this invention defined in the appended claims.

What is claimed is:

1. A method for managing green power of a virtual machine cluster which has a plurality of physical machines with some of the physical machines being in a state of running, and having at least a virtual machine, respectively, wherein total numbers of the physical machines are represented by P, and total numbers of the running physical machines are represented by p, comprising following steps:
   calculating a gross occupied resource weight ratio of the virtual machine cluster which is represented by $\Theta_{LOAD}$;
   wherein said physical machines are provided with resources of processors and memories, and said gross occupied resource weight ratio is calculated based on the resources of the processors and the memories;
   wherein the gross occupied resource weight ratio $\Theta_{LOAD}$ is calculated with following equation:

$$\theta_{Load} = \sum_{i=1}^{n}(VM_{jiCPUuse} * VM_{jiRAMallocate}) \Big/ \sum_{j=1}^{P}(PM_{jCPU} * PM_{jRAM})$$

wherein j is a serial number of the respective physical machine, i is a serial number of the respective virtual machine, p represent the total numbers of the running physical machines of the virtual machine cluster, n represents total numbers of the virtual machines, $VM_{jiCPUuse}$ is a processor load rate of i virtual machine in j physical machine, $VM_{jiRAMallocate}$ is a memory allocation of i virtual machine in j physical machine, $PM_{jCPU}$ is a processor resource in j physical machine, and $PM_{jRAM}$ is a memory resource in j physical machine;

when said gross occupied resource weight ratio being greater than a maximum tolerant occupied resource weight ratio which is represented by λ, and a condition p<P being true, electing and waking up a standby physical machine in non-running physical machines of the physical machines to join as one of the running physical machines;

when said gross occupied resource weight ratio being less than a minimum critical occupied resource weight ratio which is represented by β, and a condition p>1 being true, electing one of said running physical machines as a migration physical machine and moving said virtual machine in said migration physical machine to other running physical machines, and shutting off said migration physical machine; and executing a resource allocation process to allocate loads of the running physical machines.

2. The method for managing green power of a virtual machine cluster as defined in claim 1, wherein said standby physical machine is a non-running physical machine capable for said gross occupied resource weight ratio being calculated again to obtain a result closest to a result calculated with an expression (λ+β)/2 after being joined as one of the running physical machines.

3. The method for managing green power of a virtual machine cluster as defined in claim 1, wherein one of the running physical machines with the least load is elected as the migration physical machine.

4. The method for managing green power of a virtual machine cluster as defined in claim 1, wherein one of the running physical machines with the least virtual machines is elected as the migration physical machine.

5. The method for managing green power of a virtual machine cluster as defined in claim 1, wherein said resource allocation process, which is a dynamic resource allocation process distributing loads of the running physical machines evenly, further comprises following steps:

calculating a virtual machine occupying resource weight of the respective virtual machine, a physical machine occupying resource weight of the respective physical machine and an average physical machine occupying resource weight of all the physical machines;

executing following steps when a difference between the physical machine occupying resource weight and the average physical machine occupying resource weight being greater than a migration default value:

electing a physical machine with a maximum physical machine occupying resource weight as a migration source machine;

electing a physical machine with a minimum physical machine occupying resource weight as a migration target machine;

calculating a migration difference between the physical machine occupying resource weight of the migration source machine and the average physical machine occupying resource weight;

electing a virtual machine in the migration source machine with the virtual machine occupying resource weight thereof closest to the migration difference as a migration virtual machine;

moving the migration virtual machine to the migration target machine.

6. The method for managing green power of a virtual machine cluster as defined in claim 5, wherein the virtual machine occupying resource weight, the physical machine occupying resource weight, and the average physical machine occupying resource weight are calculated based on the resources of the processors and the memories in the physical machine.

7. The method for managing green power of a virtual machine cluster as defined in claim 5, wherein the virtual machine occupying resource weight, the physical machine occupying resource weight, and the average physical machine occupying resource weight are calculated w following equations:

$$VM_{jiRate} = (VM_{jiCPUuse} * VM_{jiRAMallocate}) / \sum_{i=1}^{n} (VM_{jiCPUuse} * VM_{jiRAMallocate})$$

$$HOST_{jRate} = \sum_{i=1}^{v} VM_{jiRate}$$

$$\alpha = 1/p$$

wherein, j is a serial number of the respective physical machine, i is a serial number of the respective virtual machine; p represents total numbers of the running physical machines; n represents total numbers of the virtual machines; v is total numbers of the virtual machines in the respective physical machine; $VM_{jiRate}$ is a virtual machine occupying resource rate of i virtual machine in j physical machine to act as said virtual machine occupying resource weight; $VM_{jiCPUuse}$ is a processor load rate of i virtual machine in j physical machine; $VM_{jiRAMallocate}$ is a memory allocation of i virtual machine in j physical machine; $HOST_{jRate}$ is a physical machine occupying resource rate of j physical machine to act as said physical machine occupying resource weight; α is an average physical machine occupying resource rate of the physical machines to act as said average physical machine occupying resource weight.

8. The method for managing green power of a virtual machine cluster as defined in claim 5, wherein the migration default value is set by a user.

9. The method for managing green power of a virtual machine cluster as defined in claim 1, wherein the maximum tolerant occupied resource weight ratio and the minimum critical occupied resource weight ratio are set by the user.

* * * * *